United States Patent
Ishino et al.

(10) Patent No.: US 6,595,328 B1
(45) Date of Patent: Jul. 22, 2003

(54) CIRCULATING TYPE FOOD AND DRINK TRANSPORT APPARATUS

(75) Inventors: Yuichi Ishino, Kanazawa (JP); Toshihiro Yoshida, Tsubata-machi (JP); Takashi Nakano, Kanazawa (JP); Kunio Morishita, Matsutou (JP); Shigeru Kubo, Torigoe-mura (JP)

(73) Assignee: Ishino Seisakusyo Co, Ltd. (JP)

(*) Notice: Subject to any disclaimer, the term of this patent is extended or adjusted under 35 U.S.C. 154(b) by 288 days.

(21) Appl. No.: 09/672,808

(22) Filed: Sep. 28, 2000

(30) Foreign Application Priority Data

Jun. 28, 2000 (JP) .......................... 2000-194801

(51) Int. Cl.$^7$ .......................... E04H 3/04; B65G 15/60; B65G 21/20; B65G 23/18
(52) U.S. Cl. .......................... 186/49; 198/805
(58) Field of Search .............. 186/49, 38, 42; 198/836.1, 679, 805

(56) References Cited

U.S. PATENT DOCUMENTS

| 3,610,161 A | * | 10/1971 | Wishart et al. | 104/88.03 |
| 3,951,074 A | * | 4/1976 | Cooper | 104/283 |
| 4,315,568 A | * | 2/1982 | Mojden | 198/690.1 |
| 4,586,601 A | * | 5/1986 | Hodlewsky | 198/690.1 |
| 4,624,617 A | * | 11/1986 | Belna | 104/282 |
| 4,805,761 A | * | 2/1989 | Totsch | 104/156 |
| 5,415,251 A | * | 5/1995 | Akimoto | 186/49 |

FOREIGN PATENT DOCUMENTS

| DE | 02037690 A | * | 7/1980 | .......... B65G/17/06 |
| JP | 11-46959 | | 2/1999 | .......... A47G/23/08 |
| JP | 11-164763 | | 6/1999 | .......... A47G/23/08 |
| JP | 11-225865 | | 8/1999 | .......... A47G/23/08 |
| JP | 11-313747 | | 11/1999 | .......... A47G/23/08 |

* cited by examiner

*Primary Examiner*—Donald P. Walsh
*Assistant Examiner*—Mark J Beauchaine
(74) *Attorney, Agent, or Firm*—Hayes Soloway P.C.

(57) ABSTRACT

In a circulating type food and drink transport apparatus, since a first magnet and second magnets are disposed such that the same magnetic poles thereof confront each other, when a food and drink vessel is placed on a transport path, the first magnet faces the second magnets through the same polarities. Thus, the first magnet is subjected to the repulsive force of the second magnets, whereby the food and drink vessel tends to be stably located between adjacent magnets of the second magnets. When the second magnets are circulatingly traveled in a predetermined direction, the first magnet circulatingly travels at the same speed as the traveling speed of the second magnets because it tends to secure the above stable position. Since the repulsive force exists between the second magnets and the first magnet, the food and drink vessel can be taken up with a relatively small amount of force as well as it is made difficult for the transport path to be scratched by the food and drink vessel when it is circulatingly transported.

32 Claims, 13 Drawing Sheets

CIRCULATING TYPE FOOD AND DRINK TRANSPORT APPARATUS

BACKGROUND OF THE INVENTION

1. Field of the Invention

The present invention relates to a circulating type food and drink transport apparatus for circulatingly transporting "sushi" and the like through an endless transport path formed along a food and drink counter to serve them to customers.

2. Description of the Related Art

In a circulating type food and drink transport apparatus used in "sushi" shops usually called a "kaiten zushi" (a "sushi" shop using a circulating type "sushi" transport apparatus), there has been ordinarily used a crescent chain conveyer Y as shown in FIG. 14. The conveyer Y has a multiplicity of supports a which are formed in a crescent shape when viewed on a plan view and mounted on a chain b circulatingly traveling in an endless fashion so that the supports a rotate relatively with respect to the chain b.

Since an endless transport path is formed and circulated in the above-mentioned conventional crescent chain conveyer Y, a curved portion inevitably exists therein. Accordingly, adjacent supports a are coupled with the chain b with necessary gaps formed therebetween so as to rotate relatively with respect to each other to permit the respective supports a to smoothly travel at the curved portion. With this arrangement, foreign substances such as grains of rice and the like are liable to enter the gaps and adhere therein. Thus, there is a problem that a time-consuming job for removing them is necessary and further the existence of the gaps themselves is not preferable from a sanitary point of view.

To solve the above problem, the applicant devised a circulating type transport apparatus in which the surface of a transport path can be very easily cleaned and technologies for the apparatus have been disclosed in Japanese Unexamined Patent Application Publication Nos. 11-225865, 11-046959, 11-164763, and 11-313747.

FIGS. 14 and 15 schematically show a part of a transport apparatus having the above magnet type transport unit, wherein the transport unit a is composed of an endlessly traveling chain b, brackets c mounted thereon at predetermined intervals, and permanent magnets d fixed on the upper surfaces of the respective brackets c.

"Sushi" plates g, each of which is received by and supported on a transport path e on both the sides of the lower surface of the outer periphery of the transport path e, are circulated by being held by the attracting force of the permanent magnets d in such a manner that the magnetic metal pieces h, which are mounted on the lower surfaces of the "sushi" plates g, approach the upper ends of the respective permanent magnets d.

In this case, the permanent magnets d are mounted such that all the polarities thereof are arranged as N-poles on a lower side and all the polarities thereof are arranged as S-poles on an upper side (or verse versa).

When the polarities of the permanent magnets d are arranged uniformly such that the N-poles thereof are disposed on the lower side and the S-poles thereof are disposed on the upper side as described above, since the magnetic lines of force of adjacent permanent magnets d are directed in the same direction to each other as shown in FIG. 16 (which shows a case in which the N-poles are disposed on the lower side), a magnetic flux density is increased, and thus a strong magnetic field is formed in a relatively wide range.

The above disposition of the polarities has an advantage that a force for attracting the "sushi" plates q is increased. However, since a force necessary to separate the "sushi" plates g from the permanent magnets d also is increased, "sushi" and the like may be dropped by a reaction force which is caused when a customer strongly pulls up a "sushi" plate g.

Further, when the permanent magnet d strongly attracts the "sushi" plate g, a large amount of friction force is generated between the "sushi" plate g and the transport path on which the "sushi" plate g slides. Accordingly, a line-shaped scratch, which represents the locus of the "sushi" plate g, is made on a transport path surface e, whereby the outside appearance of the transport path surface e is marred as well as it is made more difficult by the scratch for the "sushi" plate g to slide.

SUMMARY OF THE INVENTION

An object of the present invention, which was made to solve the above problem, is to provide a circulating type food and drink transport apparatus which can reliably transport a "sushi" plate and permits the "sushi" plate and the like to be taken up with a relatively small force and the transport path of which is not scratched.

To achieve the above object, a circulating type food and drink transport apparatus for transporting food and drink transport bodies placed on an endless transport path making use of the magnetic force of magnets disposed below a transport path includes a first magnet disposed relative to each food and drink transport body, and a multiplicity of second magnets disposed below the transport path at predetermined intervals so as to circulatingly travel, wherein the first magnet and the second magnets are disposed so that the same magnetic poles thereof confront each other.

According to the present invention, when the food and drink transport body is placed on the transport path, the first magnet confronts the second magnets with the same magnetic poles thereof facing each other. Thus, the first magnet is subjected to the repulsive force of the second magnets so as to be stably located between one of the second magnets and another second magnet adjacent to it.

When the second magnets are circulatingly traveled in a predetermined direction, the first magnet circulatingly travels at the same speed as the traveling speed of the second magnets because it tends to secure the above stable position. Since repulsive force exists between the second magnets and the first magnet, the food and drink vessel can be taken up with a relatively small amount of force as well as it is made difficult for the transport path to be scratched by the food and drink vessel when it is circulatingly transported.

In the above transport apparatus, it is preferable that food and drink vessels be locked on transport trays placed on the endless transport path and that the first magnet be disposed in/on the bottom plate of each transport tray or in the proximity of the bottom plate.

With this arrangement, neither a magnet nor a magnetic member need be mounted in/on the food and drink vessel. Thus, not only the cost of the food and drink vessel can be reduced but also when the food and drink vessel is taken up, a customer does not feel abnormally because there is no effect of magnet.

In the above transport apparatus, it is preferable that food and drink vessels be placed in/on the endless transport path and that the first magnet be disposed in/on the bottom plate of each food and drink vessel or in the proximity of the bottom plate.

With this arrangement, since only the food and drink vessels are transported, a plurality of the food and drink vessels can be placed on the endless transport path.

In the above transport apparatus it is preferable that at least two pieces of the first magnets be disposed in/on the bottom plate of each food and drink vessel or each transport tray leaving at least a predetermined space therebetween.

With this arrangement, when the food and drink vessels and the transport paths are jammed, since each second magnet passes between at least the first two magnets, the food and drink vessels and the transport tray can be prevented from floating up.

In the above transport apparatus, it is preferable that two magnets having approximately the same magnetic force be disposed leaving at least a predetermined space therebetween as the first magnets.

With this arrangement, since each second magnet passes through the center between at least the first two magnets in the occurrence of jam, the floating up of the food and drink vessels and the transport tray can be prevented as far as possible as well as the food and drink vessels and the transport trays are transported in a predetermined direction at all times by the repulsion between the first magnets and the second magnet.

In the above transport apparatus, it is preferable that a third magnet be disposed in addition to at least the two magnets as the first magnets such that the different polarities of the third magnet and the second magnets confront each other and that the third magnet is located so as to have the same distance to each of the first magnets.

With this arrangement, since the second magnets additionally attract the third magnet, the food and drink transport bodies are transported in a predetermined direction at all times.

In the above transport apparatus, it is preferable that the third magnet have magnetic force set smaller than that of at least the first magnets With this arrangement, since the attracting force between the second magnets and the third magnet is set to a minimum value necessary to determine the transport direction of the food and drink transport bodies, the attracting force does not adversely affect the food and drink transport bodies when they are taken up.

In the above transport apparatus, it is preferable that a magnetic material which is not a permanent magnet be disposed in addition to at least the two magnets as the first magnets and that the magnetic material is located so as to have the same distance to each of the first magnets.

With this arrangement, magnetic force for determining a direction of the food and drink vessels can be obtained at a relatively low cost.

In the above transport apparatus, it is preferable that all of the second magnets have approximately the same magnetic force and that each food and drink transport body having the first magnet travel on the transport path at approximately the center between two adjacent magnets of the second magnets.

With this arrangement, since each of the food and drink vessels is located on the transport path at approximately the center between adjacent second magnets and move while keeping this position, the food and drink vessels are circulatingly transported orderly at equal intervals.

In the above transport apparatus, it is preferable that a pair of slide members having a small coefficient of friction are disposed on both the sides of the transport path so as to form a necessary gap between the first magnet of each food and drink vessel or each transport tray and the second magnets.

With this arrangement, since each of the food and drink vessels and the transport trays is transported while the bottom surfaces thereof are in sliding contact with the pair of slide members disposed on the inner bottom surfaces of the transport path and having the small coefficient of friction, they have a small slide resistance. Accordingly, when the slide members are applied to the transportation of, for example, "sushi" plates and the like, they can be circulatingly transported smoothly without the need of increasing the magnetic force of both the magnets.

It is preferable that the upper surface of each slide member have an arc-shaped cross section.

With this arrangement, since the areas of the pair of slide members in contact with the food and drink vessels or the transport trays are reduced, a frictional resistance is reduced and the food and drink vessels or the transport trays can be more smoothly transported.

It is preferable that the slide members be composed of any of fluorine resin, acetal resin, polyamide resin, polyethylene resin.

With this arrangement, since any of the above materials has a small coefficient of friction and is hard and excellent in wear resistance, the wear of the slide members is suppressed and the life thereof can be greatly increased.

It is preferable that the portion, which is in sliding contact with at least the slide members, of each food and drink vessel or each transport tray is composed of a material having a small coefficient of friction.

With this arrangement, since the slide resistance of the food and drink vessels or the transport trays are more reduced, the food and drink vessels can be more smoothly transported even if both the magnets have a small amount of attracting force.

DESCRIPTION OF THE PREFERRED EMBODIMENTS

Embodiments of the present invention will be described below in connection with the accompanying drawings.

Figure 1:
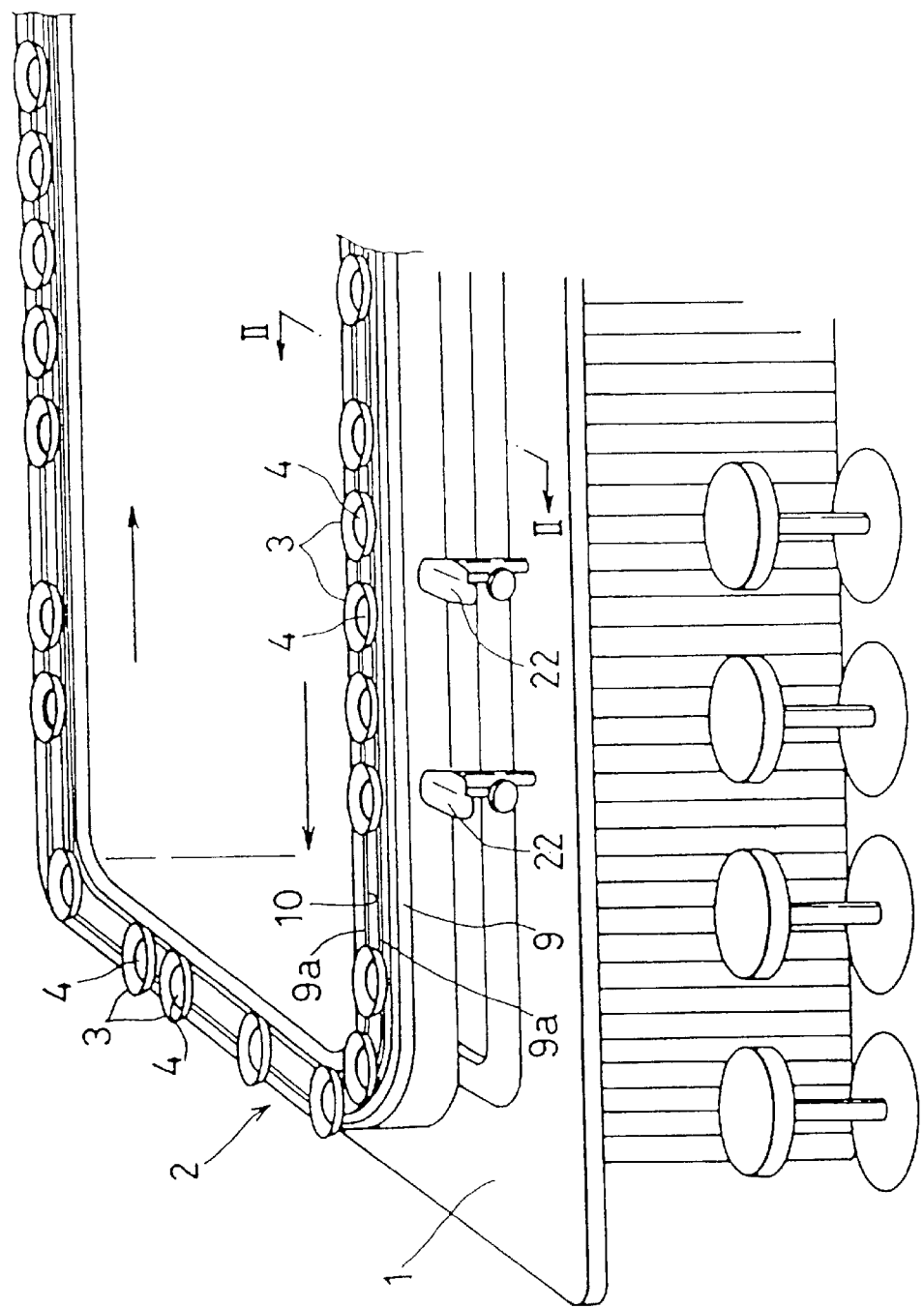
FIG. 1 is an outside perspective view of a "sushi" transport apparatus according to a first embodiment.

FIG. 1 is a partial outside perspective view showing a first embodiment in which the present invention is applied to a circulating type food and drink transport apparatus for transporting "sushi". In the figure, the circulating type food and drink transport apparatus of the present invention (hereinafter, simply referred to as a transport apparatus) 2 is disposed on the upper surface of a food and drink counter 1 along it in an endless fashion.

Reference numeral 3 denotes food and drink vessels, each of which is composed of synthetic resin or porcelain and transported by being placed on the transport apparatus 2. That is, reference numeral 3 denotes "sushi" plates, as a food and drink transport body and a "sushi" 4 and the like as foods are placed on each of the "sushi" plates. A permanent magnet 20 as a first magnet is fixed on the bottom plate 3c of the "sushi" plate 3 at the center thereof as apparent from FIGS. 2 and 3.

Figure 2:
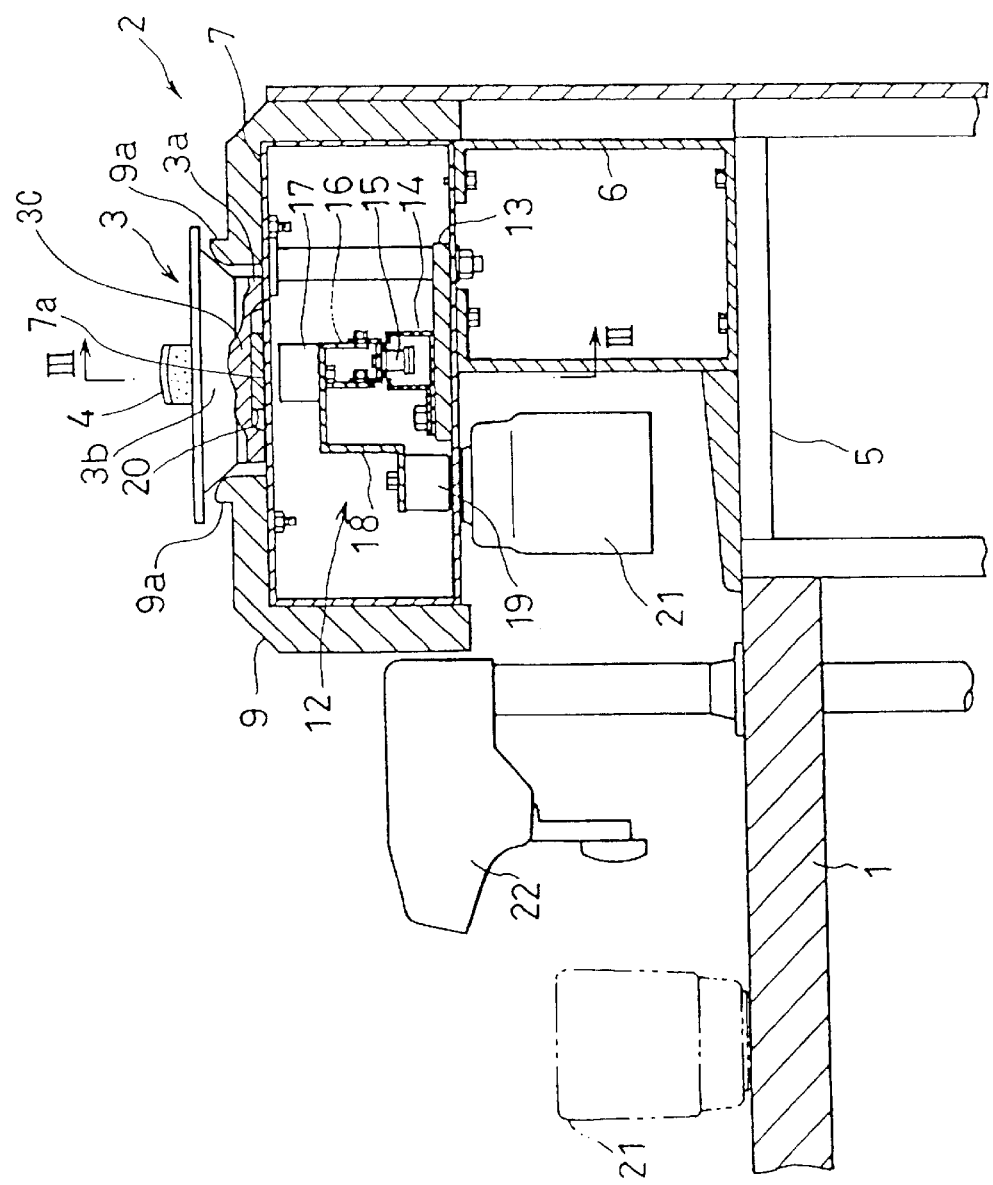
FIG. 2 is an enlarged longitudinal sectional front elevational view taken along line II—II of FIG. 1
Figure 3:
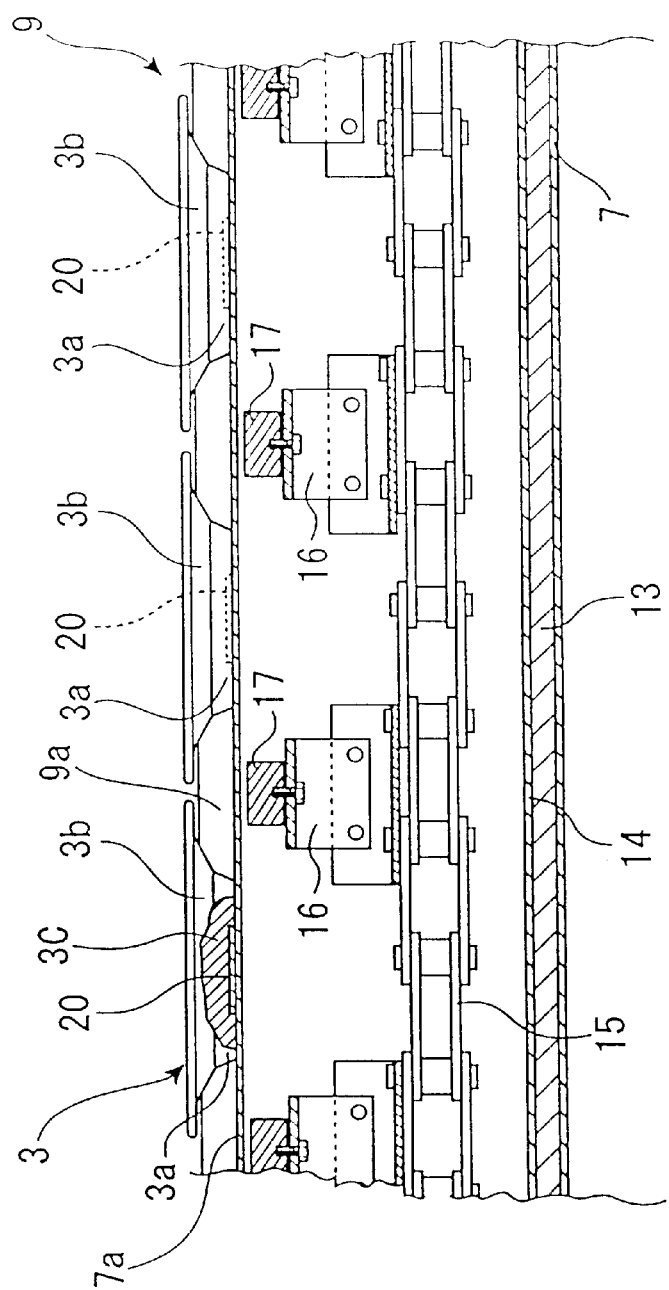
FIG. 3 is a longitudinal sectional side elevational view taken along line III—III of FIG. 2.

The transport apparatus 2 is arranged as shown in FIGS. 2 and 3, and a support bracket 6 for supporting the transport apparatus 2 is fixed on the upper surface of a base table 5, which stands in proximity of the inner end (right end in FIG. 2) of the food and drink counter 1. A rectangular-tube-shaped duct 7, whose longitudinal cross section is formed in a laterally long rectangular shape, is mounted on the support bracket 6 in an endless fashion along the food and drink counter 1. The duct 7 is composed of resin.

Guide members 9, which act as covers, are fixed on both the side surfaces and on the upper surface of the duct 7. Upward guides 9a and 9b are formed so as to project from both the guide members 9 along a transport path.

The flat bottom surface of the annular bottom portion 3a, which constitutes the outer peripheral portion of the bottom surface of the "sushi" plate 3, is in sliding contact with the upper surface of the upper surface plate 7a which constitutes the outer upper surface of the duct 7. When the "sushi" plate 3 is in sliding contact with the duct 7, the inverted-taper-shaped back surface 3b of the "sushi" plate 3 is located in the proximity of the upper inward end edges of the upward guides 9a and 9b of the guide members 9, whereby a large amount of movement of the "sushi" plate 3 in a right to left direction can be prevented when it is transported.

A magnet type transport mechanism 12 is disposed in the duct 7. The transport mechanism 12 is composed of an endless chain rail 14, which is fixed on a support base plate 13 secured on an upper surface in the duct 7 through bolts, an endless drive chain 15, which is guided by the chain rail 14 and circulates inwardly of the food and drink counter 1, and permanent magnets 17 as second magnets, which are mounted on the upper surfaces of brackets 16 secured on the upper end of the drive chain 15 at predetermined intervals so that the upper end surfaces of the permanent magnets 17 are in close proximity to the back surface of the duct 7.

Figure 4:
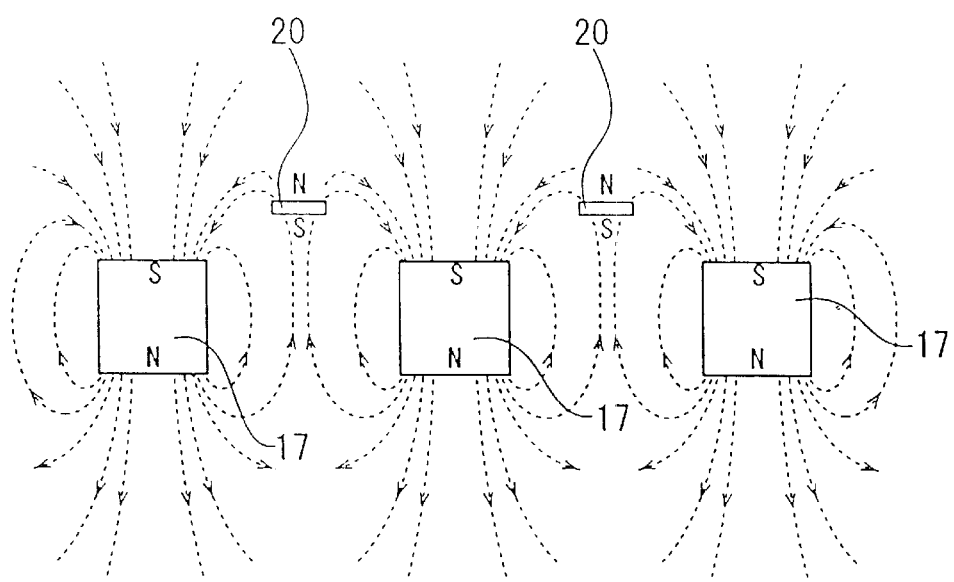
FIG. 4 is a schematic view showing how magnets are disposed in the first embodiment.

FIG. 4 shows how the permanent magnets 17 and 20, which are unique in the present invention, are disposed. The N-poles or the S-poles of the respective permanent magnets 17 in a permanent magnet train which are located adjacent to each other are uniformly directed in the same direction (vertical direction). That is, in the first embodiment, the permanent magnets 17 are disposed such that the S-poles of all of them are directed upward. Each of the permanent magnet 17 disposed here is a columnar magnet having a magnetic force of about 4500 gausses, a diameter of 22 mm and a height of 11 to 12 mm.

The respective permanent magnets 17, which constitute the permanent magnet train, are disposed such that the distance between the centers of adjacent magnets is set to about 60 mm. Further, the upper surface of each permanent magnet 17 is separated from the lower surface of the permanent magnet 20 secured to the bottom surface of each "sushi" plate 3 at the center thereof by the upper surface plate 7a of the duct 7, and each permanent magnet 17 and each "sushi" plate 3 are disposed so that a gap of about 5 to 7 mm is held therebetween in an up and down direction.

Further, all the permanent magnets 20 are uniformly secured on the "sushi" plates 3 such that the S-poles or the N-poles thereof face downward. That is, in the first embodiment, all the permanent magnets 20 are disposed such that the S-poles thereof face downward. As described above, according to the example shown in FIG. 4, all the permanent magnets 17 are disposed such that the S-poles thereof face upward, whereas the S-poles of all the permanent magnets 20 secured on the lower surfaces of the "sushi" plates 3 face downward. Accordingly, when one "sushi" plate 3 is placed above one permanent magnet 17, the "sushi" plate 3 is substantially subjected to upward repulsive force.

As shown in FIG. 2, another permanent magnet 19 is mounted downward on the lower surface of another downward bracket 18 secured on each of brackets 16. Since the metal piece (not shown) secured on the bottom surface of a tea cup 21 is attracted by the downward permanent magnet 19, the tea cup 21 is circulatingly transported in an upset state. A customer can remove the tea cup 21 which is being transported, and take out it on the food and drink counter 1 and drink tea by pouring it into the tea cup 21. Reference numeral 22 denotes a hot-water supplier standing on the upper surface of the food and drink counter 1.

In the transport apparatus 2 of the first embodiment, when the "sushi" plates 3, on each of which the "sushi" 4 is placed, is loaded on the upper surface plate 7a of the duct 7 in the state that the drive chain 15 of the magnet type transport mechanism 12 is circulatingly traveled, the permanent magnets 20 on the lower surfaces of the "sushi" plates 3 are subjected to the repulsive force of the permanent magnets 17 traveling together with the drive chain 15. Thus, each of the "sushi" plates 3 is located at the center between permanent magnets, which are adjacent to each other, of the permanent magnets 17 as shown in FIGS. 3 and 4 and transported with the lower surface of the bottom portion 3a of the "sushi" plate 3 in sliding contact with the upper surface plate 7a. While the "sushi" plates 3 are being transported, a customer can catch any one of the "sushi" plates 3 he or she likes with a hand and remove it.

To describe the above transport function in detail, since the permanent magnets 20 and the permanent magnets 17 are disposed such that the same magnetic poles of the permanent magnets 20 and 17 are in confrontation with each other, when the "sushi" plates 3 as the food and drink vessels are placed on the transport path, the permanent magnets 20 confront the permanent magnets 17 through the same magnetic poles thereof. As a result, the permanent magnets 20 are subjected to the repulsive force of the permanent magnets 17 so that each permanent magnet 20 tends to be located stably between permanent magnets 17, which are adjacent to each other, of the permanent magnets 17.

When the permanent magnets 17 are circulatingly traveled by the drive chain 15 in a predetermined direction, the permanent magnet 20 of each "sushi" plate 3 circulatingly travels at the same speed as the traveling speed of the permanent magnets 17 to secure the above-mentioned stable position. Since the repulsive force exists between the permanent magnets 20 and the permanent magnets 17, the food and drink vessels can be taken up with a relatively small amount of force as well as it is made difficult for the transport path to be scratched when the food and drink vessels are circulatingly transported.

Further, according to the first embodiment, since all the permanent magnets 17 have substantially the same magnetic force, any permanent magnet 20 can be stably located on the transport path at substantially the center between two adjacent permanent magnets 17 and the "sushi" plates 3 are moved while securing the position, the "sushi" plates 3 can be circulatingly transported orderly at equal intervals.

Note that, in the above first embodiment, since the tea cups 21 also are transported in the upset state while attracted by the permanent magnets 19 disposed below them, there is not a possibility that foreign substances such as dusts and the like enter the tea cups 21, where by a very sanitary state can be obtained. Further, it is possible to save a job for carrying the tea cup 21 to a customer sitting at the food and drink counter 1.

Figure 5:
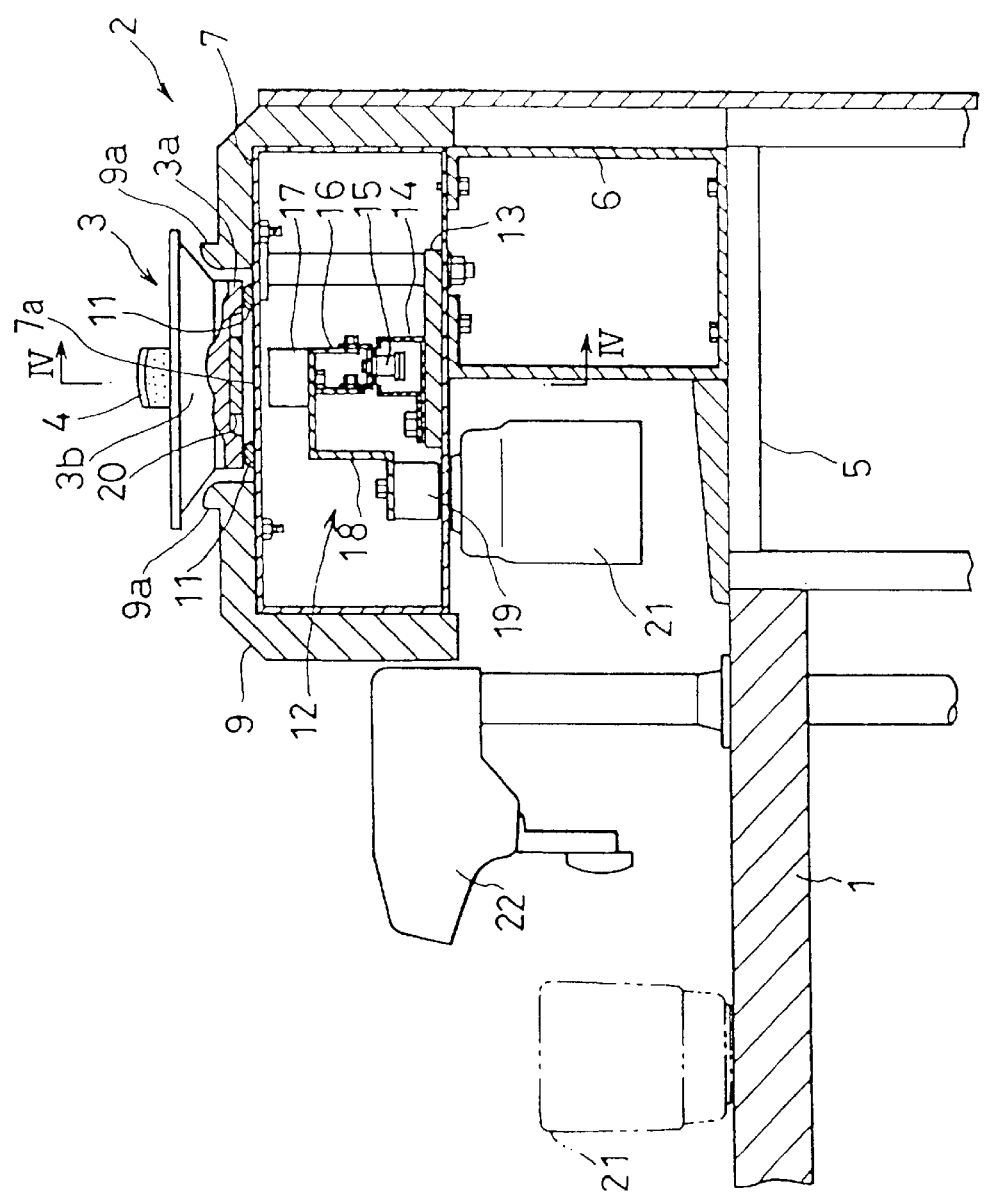
FIG. 5 is a view showing a second embodiment in correspondence to FIG. 2.
Figure 6:
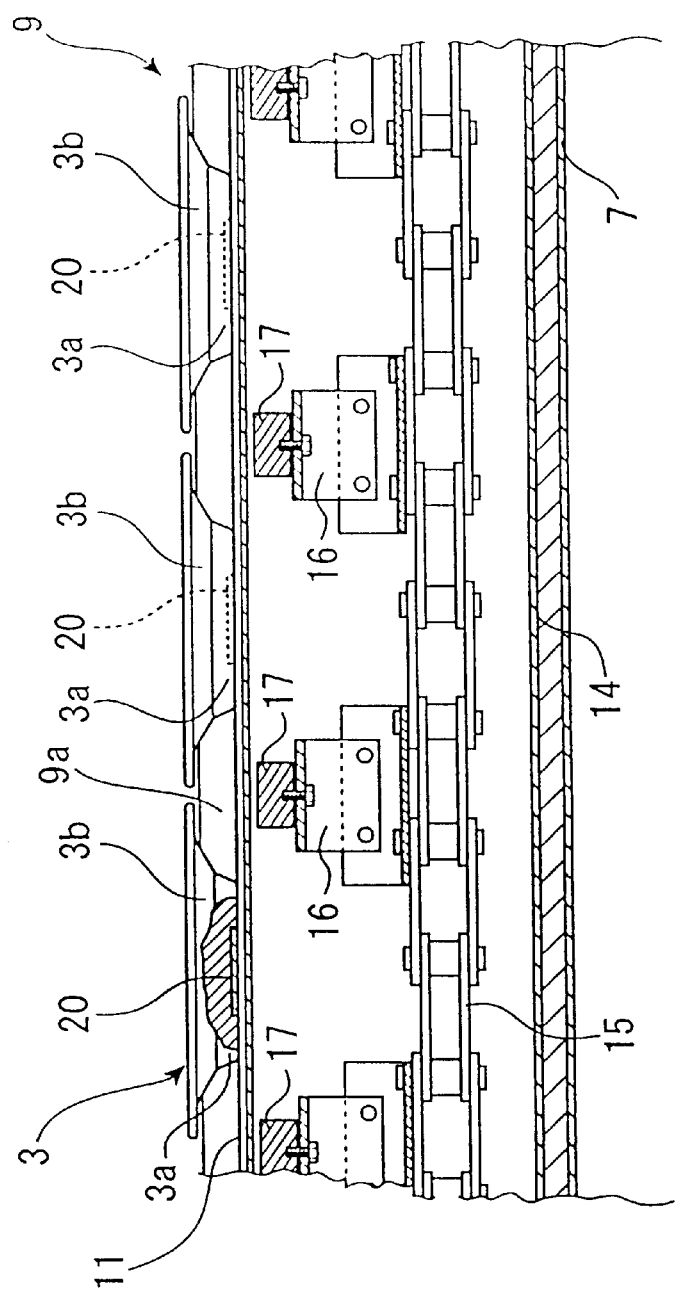
FIG. 6 is a longitudinal sectional side elevational view taken along line IV—IV of FIG. 5.

FIGS. 5 and 6 shows a second embodiment of the present invention, in which a distance (height) between each of permanent magnets 20 and each of permanent magnets 17 can be adjusted and friction force between a "sushi" plate 3 and a transport path can be reduced. To describe the second embodiment in detail, a pair of right and left slide members 11, which are composed of a hard synthetic resin material, for example, fluorine resin (commodity name: Teflon), acetal resin, polyamide resin (nylon), polyethylene resin, etc. and the upper surface of each of which has an arc-shaped cross section, are secured on the overall upper surface plate 7a of a duct 7.

The flat bottom surface of the annular bottom portion 3a, which constitutes the outer peripheral portion of the bottom surface of the "sushi" plate 3, is in sliding contact with the upper surface of the upper surface plate 7a of the duct 7. When the "sushi" plate 3 is in sliding contact with the duct 7, the inverted-taper-shaped back surface 3b of the "sushi" plate 3 is located in the proximity of the upper inward end edges of upward guides 9a and 9b which project from both sides of guide members 9, whereby a large amount of movement of the "sushi" plate 3 in a right to left direction can be prevented when it is transported.

Further, it is preferable that the upper surface of each permanent magnet 17 be spaced from the lower surface of each permanent magnet 20, which is secured on the bottom surface of the "sushi" plate 3 at the center thereof, by the upper surface plate 7a of the duct 7 and that they be held at intervals of 5 to 7 mm from food and drink transport members. However, the intervals may be changed depending upon a magnitude of magnetic force. At this time, the intervals can be adjusted by a thickness of the slide members 11 which act as spacers.

A transport apparatus 2 of the second embodiment operates similarly to the above first embodiment. That is, when the "sushi" plates 3, on each of which a "sushi" 4 is placed, is loaded on both the slide members 11 in the state that the drive chain 15 of a magnet type transport mechanism 12 is circulatingly traveled as shown in FIG. 6, the permanent magnets 20 on the lower surfaces of the "sushi" plates 3 are subjected to the repulsive force of the permanent magnets 17 traveling together with the drive chain 15. Thus, each of the "sushi" plates 3 is located substantially at the center between permanent magnets, which are adjacent to each other, of the permanent magnets 17 and transported with the bottom surface of the bottom portion 3a of the "sushi" plate 3 in sliding contact with both the slide members 11. While the "sushi" plates 3 are being transported, a customer can catch any one of the "sushi" plates 3 he or she likes with a hand and takes out it near to him or her.

FIGS. 7 to 11 show a third embodiment of the present invention, which is different from the above first and second embodiments in that "sushi" plates 3 are not directly placed on a transport apparatus 2 but placed on transport trays 31 as food and drink transport bodies and that magnets and the like are disposed on the transport trays 31 in an improved manner.

Figure 7:
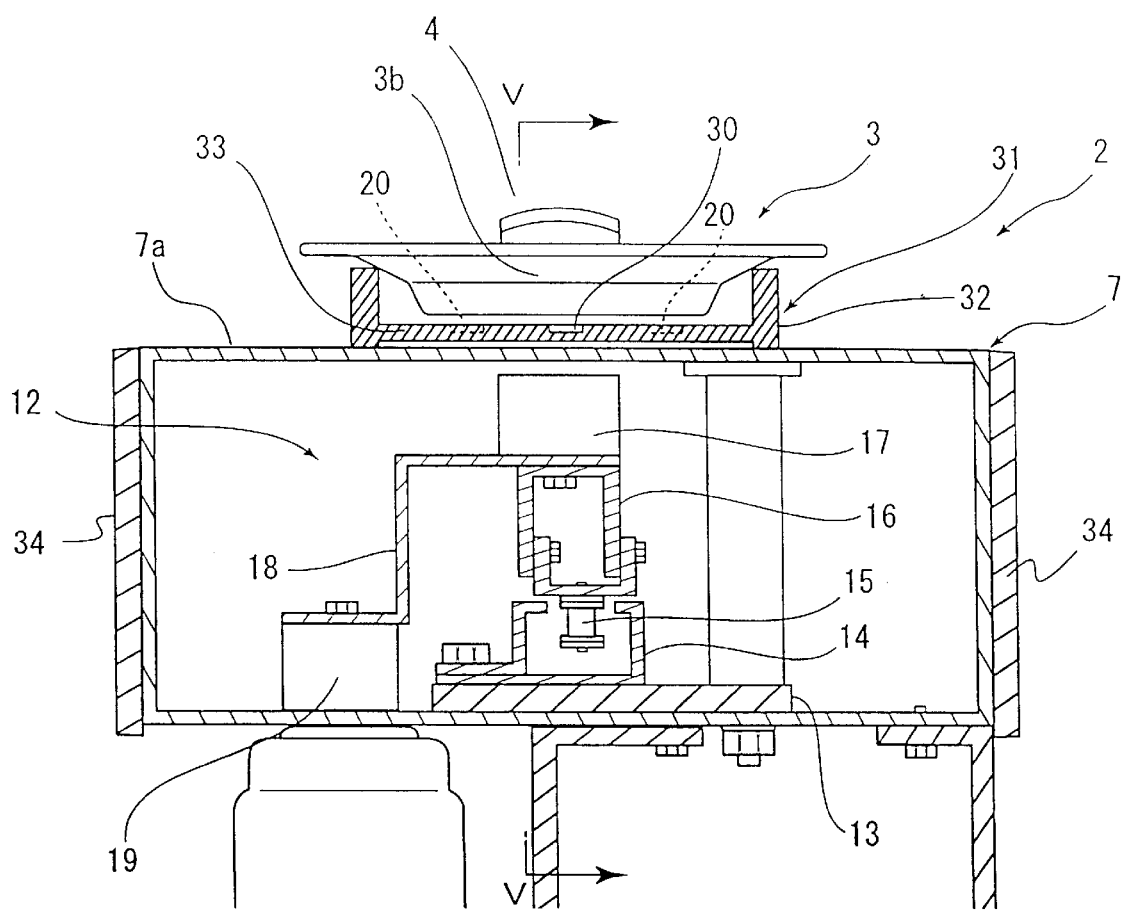
FIG. 7 is a view showing a third embodiment in correspondence to FIG. 2.
Figure 8:
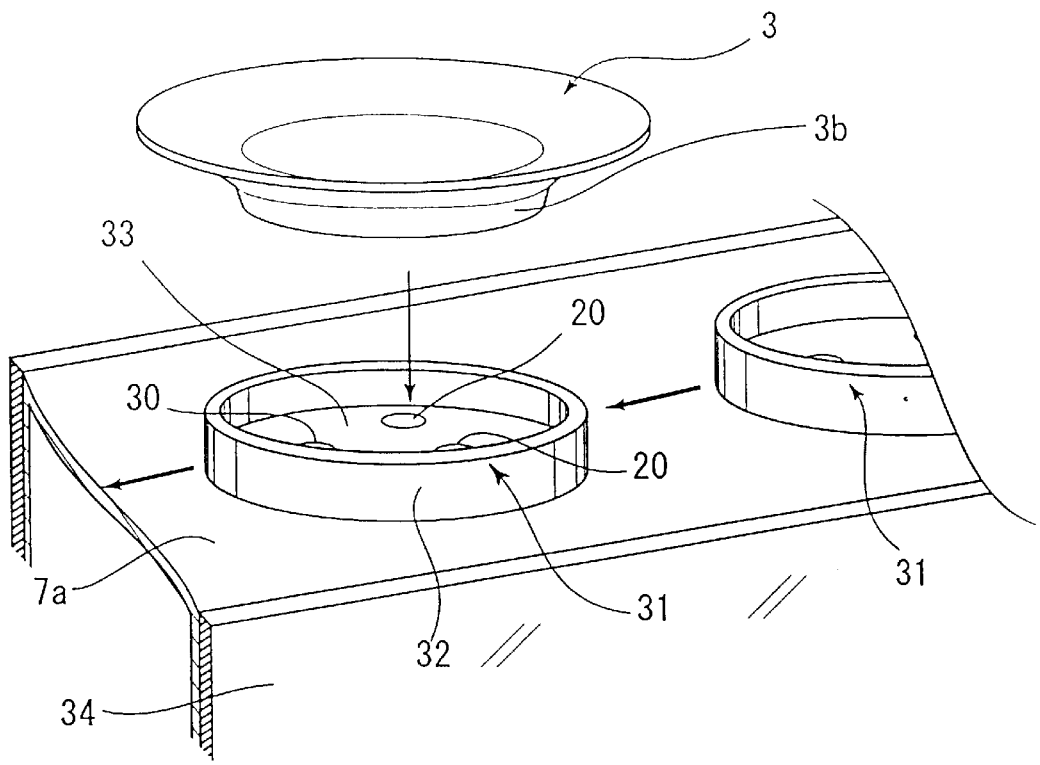
FIG. 8 is an outside perspective view of the third embodiment shown in FIG. 7.

That is, as shown in FIGS. 7 and 8, the "sushi" plates 3 are placed on the transport tray 31 as the food and drink transport bodies which are transported by being loaded on the transport apparatus 2 and composed of synthetic resin or earthware. As apparent from the figures, permanent magnets 20 as first magnets and a permanent magnet 30 as a third magnet are secured on the bottom plate 33 of each of the transport trays 31.

In the transport apparatus 2 arranged substantially similarly to those of the above respective embodiments, panels 34 acting as decorative covers are secured on both the side surfaces of a duct 7 composed of resin, and guide members, which are disposed along a transport path, are omitted.

Further, the bottom surface of the outer peripheral portion 32 of each transport tray 31, on which the "sushi" plate 3 can be placed, is in sliding contact with the upper surface of the upper surface plate 7a acting as the outside upper surface of a duct 7. When the "sushi" plate 3 is placed on any one of the transport trays 31, the inverted-taper-shaped back surface 3b of the "sushi" plate 3 is stably held on the upper side of the outer peripheral portion 32 of the transport tray 31.

A magnet type transport mechanism 12 is disposed in the duct 7. Similarly to the above embodiments, the transport mechanism 12 is composed of an endless chain rail 14 secured on a base table 13, which is secured on the upper surface in the duct 7, by bolts, a endless drive chain 15 circulatingly traveling in the inside of a food and drink counter 1 by being guided by the chain rail 14, and permanent magnets 17 as second magnets mounted on the upper portions of brackets 16 secured on the upper end portion of the drive chain 15 at predetermined intervals so that the upper end surfaces thereof are located in the proximity of the back surface of the guide duct 7.

Figure 9:
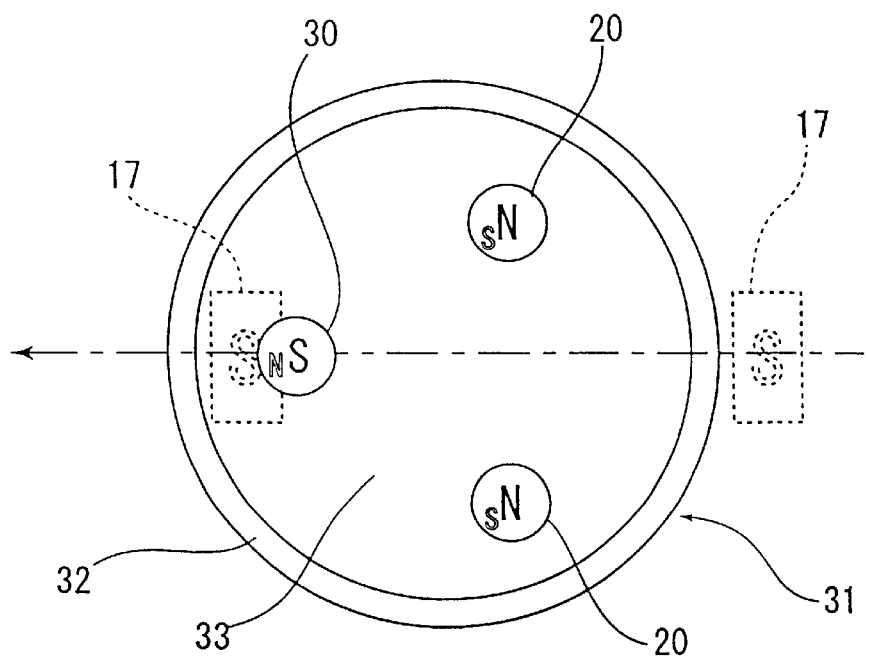
FIG. 9 is a plan view of a transport tray of the third embodiment.
Figure 10:
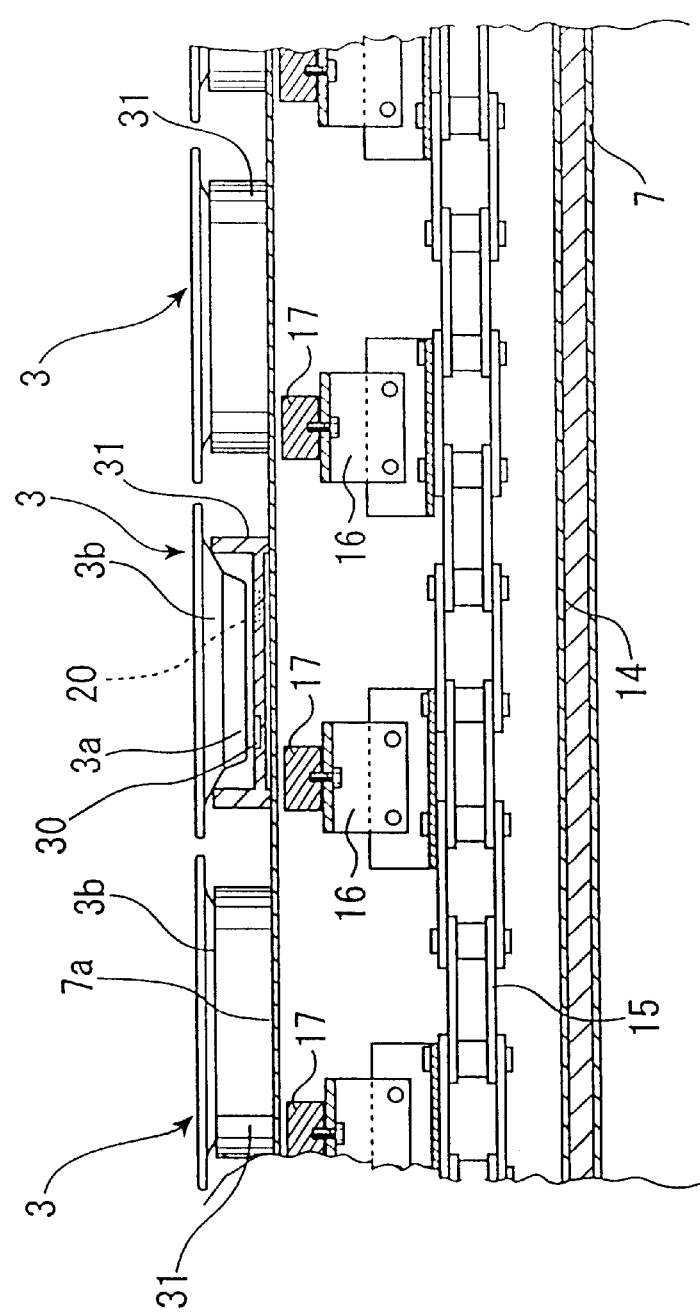
FIG. 10 is a longitudinal side elevational view taken along line V—V of FIG. 7.

FIG. 9 is a plan view of the transport tray 31 when it is viewed from above it, in which the permanent magnets 20 as the first magnets are disposed symmetrically right and left with respect to a line along which the transport tray 31 travels as well as the permanent magnet 30 a the third magnet is disposed on the travel line. In this case, the permanent magnets 20 are embedded such that the N-poles thereof are located upward and the S-poles thereof are located downward, whereas the permanent magnet 30 is embedded such that the S-pole thereof is located upward and the N-pole thereof is located downward. In contrast, the permanent magnets 17 as the second magnets which move below the transport tray 31 are disposed such that the S-pole thereof are located upward.

Figure 11:
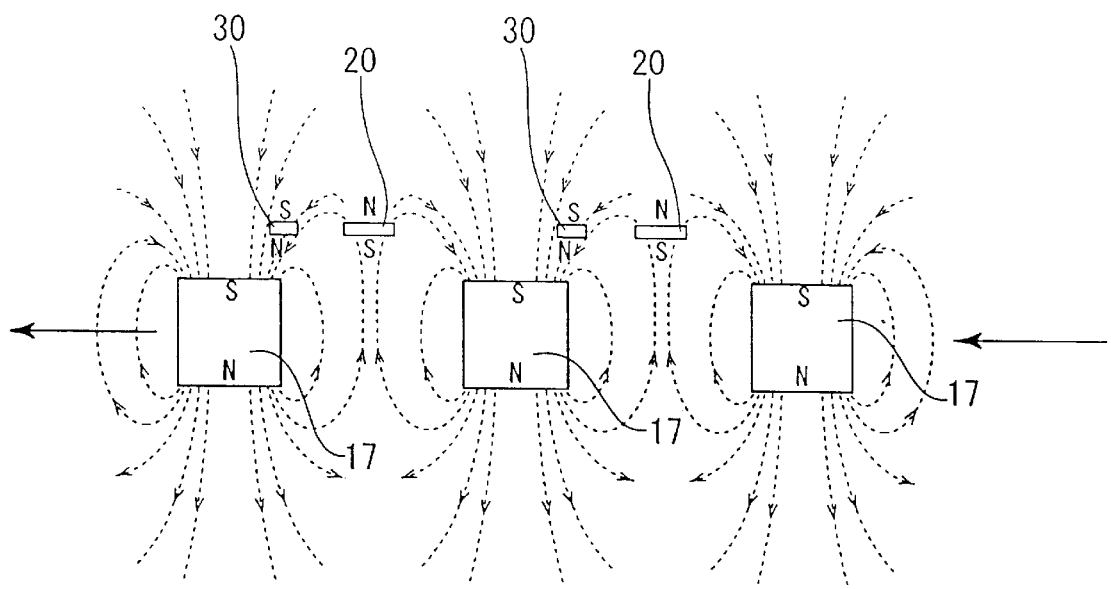
FIG. 11 is a schematic view showing how magnets are disposed in the third embodiment.

To describe the third embodiment in more detail, FIG. 11 shows how the permanent magnets 17, the permanent magnets 20 and the permanent magnets 30, which are characteristic to the present invention, are disposed, in which respective permanent magnets 17, which are adjacent to each other, of the permanent magnets 17 in a permanent magnet train are uniformly disposed such that the N-poles or the S-poles thereof face the same direction (vertical direction). That is, in the third embodiment, all the permanent magnets 17 are disposed such that the S-poles thereof face upward. Each of the permanent magnets 17 disposed here is a columnar magnet having magnetic force of about 4500 gauss, a diameter of 22 mm and a height of 11 to 12 mm.

The respective permanent magnets 17, which constitute the permanent magnet train, are disposed such that the distance between the centers of adjacent magnets thereof is set to about 60 mm. Further, the upper surface of each permanent magnet 17 is partitioned from the lower surfaces of the two permanent magnets 20 secured on the bottom surface of each transport tray 31 by the upper surface plate 7a of the guide duct 7, and the permanent magnets 17 and 20 are disposed such that vertical intervals of about 5 to 7 mm are kept therebetween. Further, each permanent magnet 20 has magnetic force of about 2600 gauss, and each permanent magnet 30 also has magnetic force of about 2600 gauss.

According to the example shown in FIG. 11, since the permanent magnets 17 are disposed such that all the S-poles thereof are located upward, the permanent magnets 20 secured on the bottom surfaces of the transport trays 31 are disposed such that all the S-poles thereof are located downward, and the permanent magnets 30 are disposed such that all the N-poles thereof are located downward, when the transport trays 31 are placed above the permanent magnets 17 arranged as a magnet train, the transport trays 31 are substantially subjected to repulsive force resulting from upward magnetic force as well as the permanent magnets 17 and 30 attract each other.

To describe the transport function in detail, since the permanent magnets 20 and 17 are disposed such that the same magnetic poles thereof confront each other, when the transport trays 31 as the food and drink transport bodies are placed on the transport path, the permanent magnets 20 confront the permanent magnets 17 through the same magnetic poles thereof. As a result, the two permanent magnets 20 are subjected to the repulsive force of the permanent magnets 17 so that the permanent magnets 20 tend to be located stably between adjacent permanent magnets.

When the permanent magnets 17 are circulatingly traveled by the drive chain 15 in a predetermined direction, since the permanent magnets 20 of each transport tray 31 tends to secure the above stable position, the transport tray 31 circulatingly travels at the same speed as the traveling speed of the permanent magnets 17. Further, since the repulsive force exists between the permanent magnets 20 and the permanent magnets 17, the transport path is difficult to be scratched by the transport trays 31 when they are circulatingly transported.

Particularly in the third embodiment, since the permanent magnet 30, which attracts the permanent magnets 17, is disposed on each transport tray 31, the traveling direction of the transport tray 31 can be stabilized. That is, since the permanent magnets 17 move below the upper surface plate 7a of the duct 7 as a transport surface approximately at the center thereof, the permanent magnet 30 disposed at approximately the center of each transport tray 31 follows the movement of the permanent magnets 17. As a result, the transport tray 31 can stably move without meandering right and left and without changing its direction.

Further, since the permanent magnets 20 are disposed symmetrically right and left with respect to the travel line, the transport trays 31 can be prevented from floating when they are jammed. That is, when the respective transport trays 31 are jammed temporarily, one transport tray 31 is collided with another transport tray 31 located in front of it and stopped and jammed thereby while the permanent magnets 17 move. When it is assumed here that the permanent magnet 20 exists on the travel line, the permanent magnet 20, which has a magnetic pole which repels the permanent magnets 17 passing below it successively, is intermittently floated up and vibrated up and down. However, in the third embodiment, since the permanent magnets 20 of each transport tray 31 do not exist on the travel line and separately disposed on the right and left sides, even if any permanent magnet 17 passes through the travel line, the up and down vibration of the permanent magnets 20 can be minimized.

Figure 12:
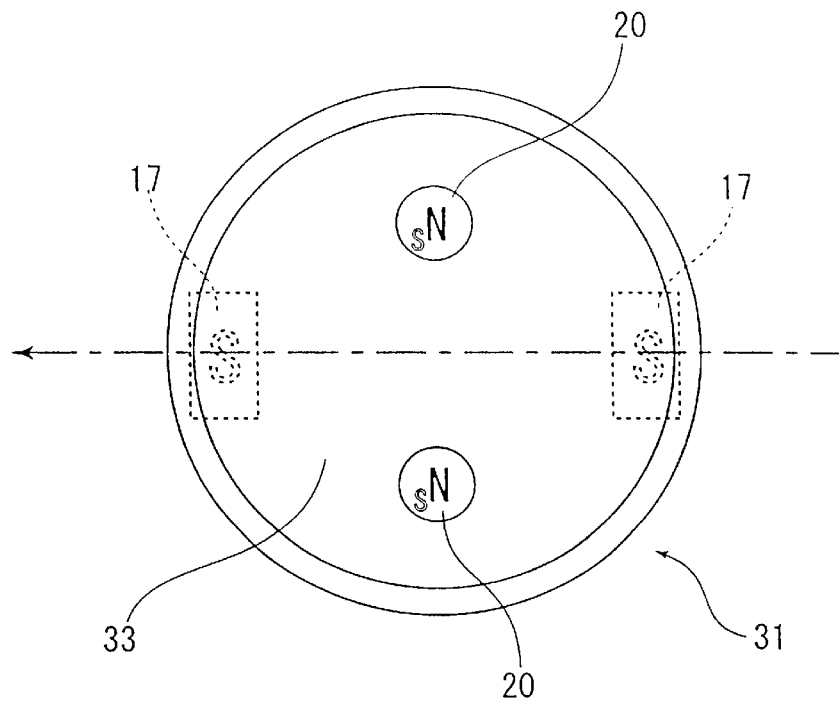
FIG. 12 is a plan view of a transport tray of a fourth embodiment.

FIG. 12 shows an example of disposition of permanent magnets in a transport tray of a fourth embodiment, in which only two permanent magnets 20 are separately disposed right and left and a permanent magnet 30 as a third magnet is omitted. Even if the permanent magnet 30 does not exists as in this case, the permanent magnets 20, 20 are stably disposed between adjacent permanent magnets 17, 17 as shown in the figure. Thus, even if rotational force is imposed on the transport tray 31, repulsive force is imposed on the transport tray 31 so as to secure the stable position in the figure.

Figure 13:
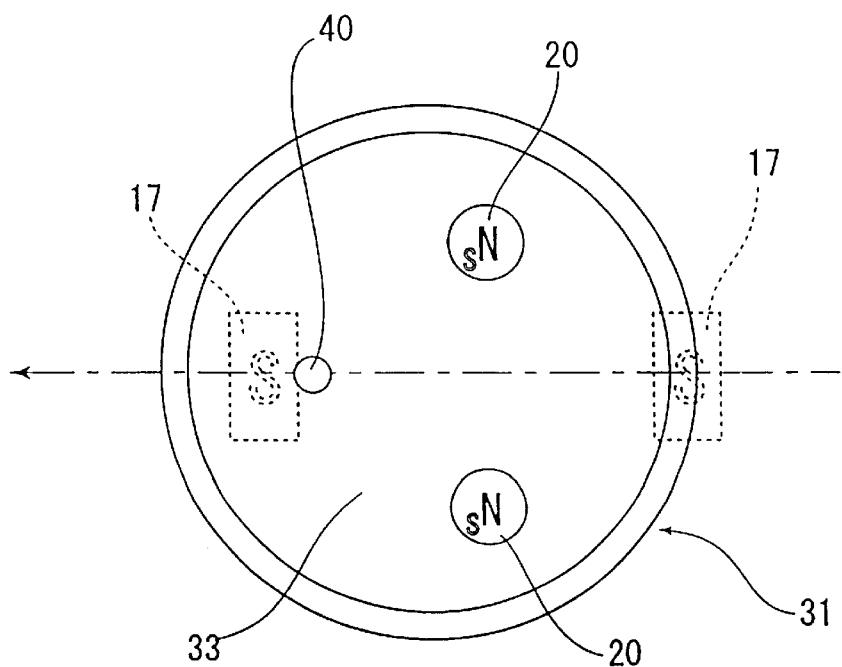
FIG. 13 is a plan view of a transport tray of a fifth embodiment.
Figure 14:
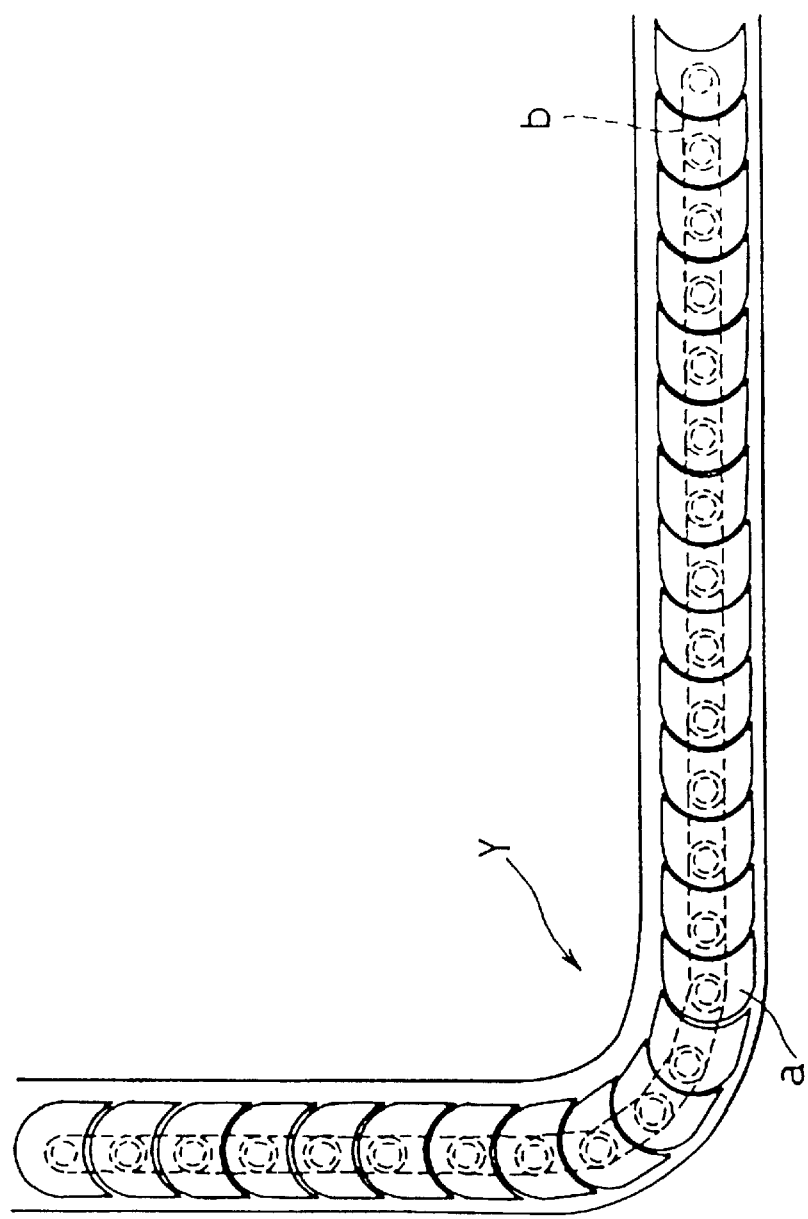
FIG. 14 is a plan view showing a conventional crescent conveyer.
Figure 15:
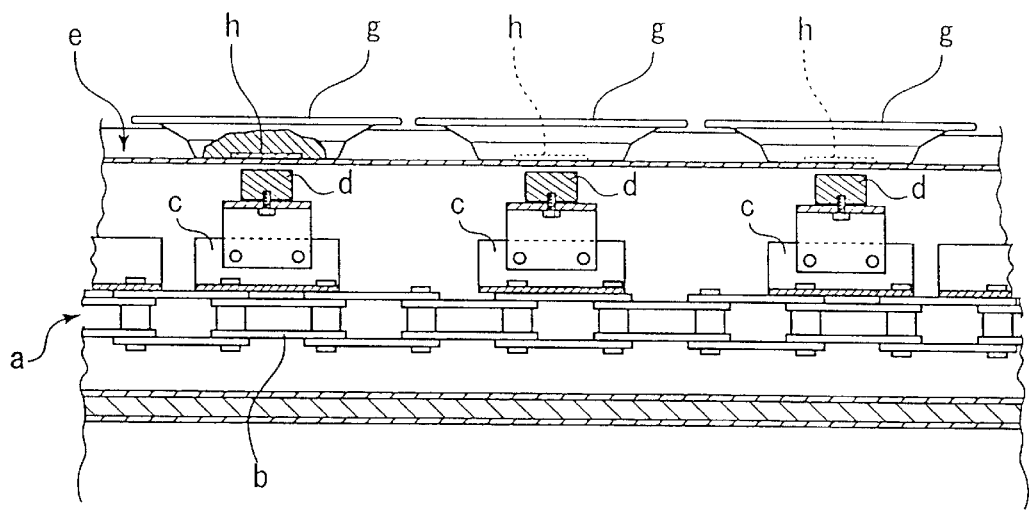
FIG. 15 is a sectional view showing a conventional chainless conveyer.
Figure 16:
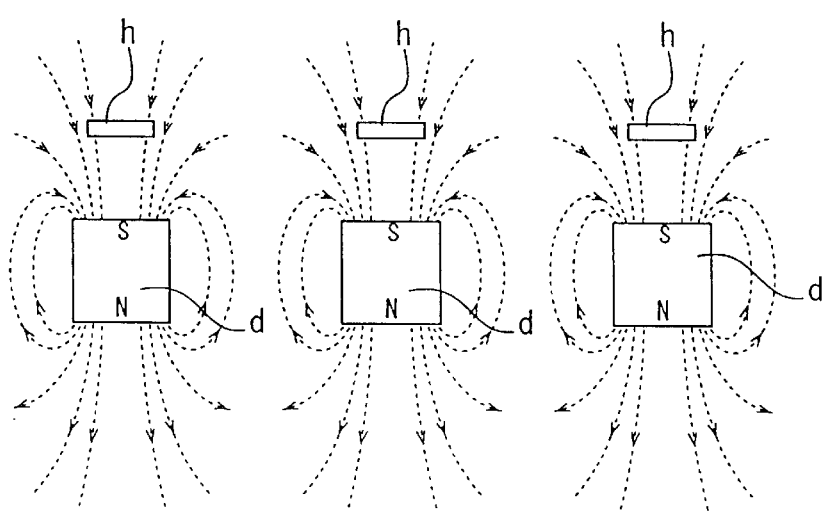
FIG. 16 is a schematic view showing how conventional magnets are disposed.

FIG. 13 shows an example of disposition of permanent magnets and the like in a transport tray of a fifth embodiment, in which two permanent magnets 20 are separately disposed right and left as well as a magnetic material 40 such as an iron piece is disposed in place of the third magnet 30 to reduce attracting force for stabilizing a direction.

Note that, in the third to fifth embodiments, neither a permanent magnet nor a magnetic material is disposed to the "sushi" plate 3 but they are disposed on the transport tray 31. Thus, when a customer takes up the "sushi" plate 3, the "sushi" plate 3 is not subjected to magnetic force at all, whereby the customer does not feel abnormally when he or she takes up the "sushi" plate 3. Further, since repulsive force resulting from magnetic force exists between the transport tray 31 and the transport apparatus 2 as described above, it is easy to remove the transport tray 31 from the transport apparatus 2 so as to clean it or to dispose it at a different location.

The present invention is not limited to the above embodiments.

That is, while the permanent magnets 17 and 19 are used in the above embodiments to simplify the arrangement of the transport apparatus by omitting a complex power supply and the like, it is needless to say that they may be replaced with electromagnets.

Further, description has been made as to the example in which the permanent magnets 20 separated to right and left are applied to the transport tray 31, it is apparent that the permanent magnets 20 separated to right and left are applicable to the "sushi" plate 3.

Further, while description has been made as the example in which respective ones of the permanent magnets 20 are disposed on the opposite sides of the travelling line, that is, the two permanent magnets 20 in total are disposed, any even numbers of the permanent magnets 20 such as 4 pieces or 6 pieces of the permanent magnets 20 may be appropriately selected so long as they are approximately symmetrically disposed across the travel line.

Further, while magnetic force of the permanent magnet 30 may be optionally set, it is preferable to set the magnetic force smaller than a total amount of magnetic force of a plurality of the permanent magnets 20.

According to the present invention, the following advantages can be obtained.

(a) According to a first aspect of the present invention, when the food and drink transport body is placed on the transport path, the first magnet confronts each of the second magnets with the same magnetic poles thereof facing each other. Thus, the first magnet is subjected to the repulsive force of the second magnets so as to be stably located between one of the second magnets and another second magnet adjacent to it.

When the second magnets are circulatingly traveled in a predetermined direction, the first magnet circulatingly travels at the same speed as the traveling speed of the second magnets because it tends to secure the above stable position. Since repulsive force exists between the second magnets and the first magnet, the food and drink vessel can be taken up with a relatively small amount of force as well as it is made difficult for the transport path to be scratched by the food and drink vessel when it is circulatingly transported.

(b) According to a modification of the first aspect of the present invention, neither a magnet nor a magnetic member need be mounted on the food and drink vessel. Thus, not only the cost of the food and drink vessel can be reduced but also when the food and drink vessel is taken up, a customer does not feel abnormally because there is no effect of magnet.

(c) According to a modification of the first aspect of the present invention, since only the food and drink vessels are transported, a plurality of the food and drink vessels can be placed on the endless transport path.

(d) According to a modification of the first aspect of the present invention, when the food and drink vessels and the transport trays are jammed, since each second magnet passes between at least the first two magnets, the food and drink vessels and the transport tray can be prevented from floating up.

(e) According to a modification of the first aspect of the present invention, since each second magnet passes through the center between at least the first two magnets in the occurrence of jam, the floating of the food and drink vessels and the transport trays can be prevented as far as possible as well as the food and drink vessels and the transport trays are transported in a predetermined direction at all times by the repulsion between the first magnets and the second magnet.

(f) According to a modification of the first aspect of the present invention, since the second magnets additionally attract the third magnet, the food and drink transport bodies are transported in a predetermined direction at all times.

(g) According to a modification of the first aspect of the present invention, since the attracting force between the second magnets and the third magnet is set to a minimum value necessary to determine the transport direction of the food and drink transport bodies, the attracting force does not adversely affect the food and drink transport bodies when they are taken up.

(h) According to a modification of the first aspect of the present invention, magnetic force for determining a direction of the food and drink transport bodies can be obtained at a relatively low cost.

(i) According to a modification of the first aspect of the present invention, since each of the food and drink vessels is located on the transport path at approximately the center between adjacent second magnets and move while keeping this position, the food and drink vessels are circulatingly transported orderly at equal intervals.

(j) According to a modification of the first aspect of the present invention, since each of the food and drink vessels and the transport trays is transported while the bottom surfaces thereof are in sliding contact with the pair of slide members disposed on the inner bottom surface of the transport path and having the small coefficient of friction, they have a small slide resistance. Accordingly, when the slide members are applied to the transportation of, for example, "sushi" plates and the like, they can be circulatingly transported smoothly without the need of increasing the magnetic force of both the magnets.

(k) According to a modification of the first aspect of the present invention, since the areas of the pair of slide members in contact with the food and drink vessels or the transport trays are reduced, a frictional resistance is reduced and the food and drink vessels or the transport trays can be more smoothly transported.

(l) According to a modification of the first aspect of the present invention, since any of the above materials has a small coefficient of friction and is hard and excellent in wear resistance, the wear of the slide members is suppressed and the life thereof can be greatly increased.

(m) According to a modification of the first aspect of the present invention, since the slide resistance of the food and drink vessels or the transport trays are more reduced, the food and drink vessels can be more smoothly transported even if both the magnets have a small amount of attracting force.

What is claimed is:

1. A circulating type food and drink transport apparatus for transporting food and drink transport bodies placed on an endless transport path making use of a magnetic force of magnets disposed below the transport path, comprises:

a first magnet disposed adjacent to each food and drink transport body; and a multiplicity of second magnets disposed below the transport path at predetermined intervals so as to circulatingly travel along the transport path, wherein (a) said first magnet and said second magnets are disposed such that the same magnetic poles thereof confront each other, (b) at least two parts of said first magnets are disposed in or on a bottom plate of each food and drink vessel or each transport tray leaving at least a predetermined space therebetween, and (c) two magnets having approximately the same magnetic force are disposed leaving at least a predetermined space therebetween as said first magnets, wherein food and drink vessels can be locked on transport trays placed on the endless transport path.

2. A circulating type food and drink transport apparatus according to claim 1, wherein food and drink vessels are placed on the endless transport path and said first magnet is disposed in or on a bottom plate of each food and drink vessel or in the proximity of the bottom plate.

3. A circulating type food and drink transport apparatus according to claim 1, wherein a third magnet is disposed in addition to said first magnets such that different polarities of said third magnet and said second magnets confront each other and said third magnet is located so as to have the same distance to each of said first magnets.

4. A circulating type food and drink transport apparatus according to claim 3, wherein said third magnet has a magnetic force smaller than that of at least said first magnets.

5. A circulating type food and drink transport apparatus according to claim 1, wherein a magnetic material which is not a permanent magnet is disposed in addition to said first magnets and said magnetic material is located so as to have the same distance to each of said first magnets.

6. A circulating type food and drink transport apparatus according to claim 1, wherein all of said second magnets have approximately the same magnetic force and each food and drink transport body having said first magnet travels on the transport path at approximately a center line of said second magnets.

7. A circulating type food and drink transport apparatus according to claim 1, wherein a pair of slide members each having a small coefficient of friction is disposed on both sides of the transport path so as to form a gap between said first magnet of each food and drink vessel or each transport tray and said second magnets.

8. A circulating type food and drink transport apparatus according to claim 7, wherein an upper surface of each of said slide members has an arc-shaped cross section.

9. A circulating type food and drink transport apparatus according to claim 7, wherein said slide members are formed of a material from the group consisting of a fluorine resin, an acetal resin, a polyamide resin and a polyethylene resin.

10. A circulating type food and drink transport apparatus according to claim 7, wherein a portion, which is in sliding contact with at least said slide members, of each food and drink vessel or each transport tray is formed of a material having a small coefficient of friction.

11. A circulating type food and drink transport apparatus according to claim 9, wherein a portion, which is in sliding contact with at least said slide members, of each food and drink vessel or each transport tray is formed of a material having a small coefficient of friction.

12. A circulating type food and drink transport apparatus for transporting food and drink transport bodies placed on an endless transport path making use of a magnetic force of magnets disposed below the transport path, comprises:
  a first magnet disposed adjacent to each food and drink transport body;
  a multiplicity of second magnets disposed below the transport path at predetermined intervals so as to circulatingly travel; and
  a third magnet disposed in addition to said first magnets such that different polarities of said third magnet and said second magnets confront each other and said third magnet is located so as to have the same distance to each of said first magnets;
  wherein said first magnet and said second magnets are disposed such that the same magnetic poles thereof confront each other, and
  said third magnet has magnetic force set smaller than that of at least said first magnets.

13. A circulating type food and drink transport apparatus according to claim 12, wherein food and drink vessels can be locked on transport trays placed on the endless transport path and said first magnet is disposed in or on a bottom plate of each transport tray or in the proximity of a bottom plate.

14. A circulating type food and drink transport apparatus according to claim 12, wherein food and drink vessels are placed on the endless transport path and said first magnet is disposed in or on the bottom plate of each food and drink vessel or in the proximity of the bottom plate.

15. A circulating type food and drink transport apparatus according to claim 13, wherein at least two parts of said first magnets are disposed in or on the bottom plate of each food and drink vessel or each transport tray leaving at least a predetermined space therebetween.

16. A circulating type food and drink transport apparatus according to claim 15, wherein two magnets having approximately the same magnetic force are disposed leaving at least a predetermined space therebetween as said first magnets.

17. A circulating type food and drink transport apparatus according to claim 13, wherein a magnetic material which is not a permanent magnet is disposed in addition to said first magnets and said magnetic material is located so as to have the same distance to each of said first magnets.

18. A circulating type food and drink transport apparatus according to claim 12, wherein all of said second magnets have approximately the same magnetic force and each food and drink transport body having said first magnet travels on the transport path at approximately a center of said second magnets.

19. A circulating type food and drink transport apparatus according to claim 12, wherein a pair of slide members having a small coefficient of friction are disposed on both sides of the transport path so as to form a gap between said first magnet of each food and drink vessel or each transport tray and said second magnets.

20. A circulating type food and drink transport apparatus according to claim 19, wherein an upper surface of each of said slide members has an arc-shaped cross section.

21. A circulating type food and drink transport apparatus according to claim 19, wherein said slide members are formed of a material selected from the group consisting of a fluorine resin, an acetal resin, a polyamide resin and a polyethylene resin.

22. A circulating type food and drink transport apparatus for transporting food and drink transport bodies placed on an endless transport path making use of a magnetic force of magnets disposed below the transport path, comprises:
  a first magnet disposed adjacent to each food and drink transport body; and
  a multiplicity of second magnets disposed below the transport path at predetermined intervals so as to circulatingly travel,
  wherein said first magnet and said second magnets are disposed such that the same magnetic poles thereof confront each other in order that said first magnet tends to be located stably between said second magnets, and
  wherein when said second magnets are moved in a predetermined direction, said first magnet travels at the same speed as the traveling speed of said second magnets to secure the above-mentioned stable position, so that each food and drink transport body having said first magnet travels along the transport path.

23. A circulating type food and drink transport apparatus according to claim 22, wherein a pair of slide members each having a small coefficient of friction is disposed on both sides of the transport path so as to form a necessary gap between said first magnet and said second magnets.

24. A circulating type food and drink transport apparatus according to claim 23, wherein said slide members are formed of a material selected from the group consisting of a fluorine resin, an acetal resin, a polyamide resin and a polyethylene resin.

25. A circulating type food and drink transport apparatus according to claim 23, wherein the upper surface of each of said slide members has an arc-shaped cross section.

26. A circulating type food and drink transport apparatus according to claim 23, wherein said food and drink transport body comprises a transport tray having a bottom plate on which a food and drink vessel can be placed, and said first magnet is disposed in or on said bottom plate of each transport tray.

27. A circulating type food and drink transport apparatus according to claim 26, wherein at least two parts of said first magnets are disposed in or on the bottom plate of each food and drink vessel or each transport tray leaving at least a predetermined space therebetween.

28. A circulating type food and drink transport apparatus according to claim 27, wherein two magnets having approximately the same magnetic force are disposed leaving at least a predetermined space therebetween as said first magnets.

29. A circulating type food and drink transport apparatus according to claim 22, wherein said food and drink transport body comprises a food and drink vessel having a bottom plate, and said first magnet is disposed in or on said bottom plate of each food and drink vessel.

30. A circulating type food and drink transport apparatus according to claim 22, wherein a third magnet is disposed in addition to said first magnets such that the different polarities of said third magnet and said second magnets confront each other, and said third magnet is located so as to have the same distance to each of said first magnets.

31. A circulating type food and drink transport apparatus according to claim 30, wherein said third magnet has magnetic force set smaller than that of at least said first magnets.

32. A circulating type food and drink transport apparatus according to claim 22, wherein a magnetic material which is not a permanent magnet is disposed in addition to said first magnets and said magnetic material is located so as to have the same distance to each of said first magnets.

* * * * *